US 7,790,275 B2

(12) United States Patent
Arai et al.

(10) Patent No.: US 7,790,275 B2
(45) Date of Patent: Sep. 7, 2010

(54) FUNCTIONAL FILM FOR DISPLAY SCREEN AND METHOD FOR PRODUCING SAME

(75) Inventors: Takayuki Arai, Tokyo (JP); Kazuhiro Kon, Saitama (JP)

(73) Assignee: Lintec Corporation, Tokyo (JP)

( * ) Notice: Subject to any disclaimer, the term of this patent is extended or adjusted under 35 U.S.C. 154(b) by 842 days.

(21) Appl. No.: 11/570,139

(22) PCT Filed: Jun. 10, 2005

(86) PCT No.: PCT/JP2005/010682

§ 371 (c)(1),
(2), (4) Date: Dec. 7, 2006

(87) PCT Pub. No.: WO2005/124729

PCT Pub. Date: Dec. 29, 2005

(65) Prior Publication Data
US 2007/0240804 A1    Oct. 18, 2007

(30) Foreign Application Priority Data
Jun. 18, 2004  (JP) ............................... 2004-180529

(51) Int. Cl.
 *B32B 7/02* (2006.01)
 *C09K 19/02* (2006.01)
(52) U.S. Cl. ...................... 428/215; 156/325; 428/1.23; 428/1.32; 428/1.52; 428/213; 428/214; 428/334; 428/335; 428/354; 428/447; 428/451
(58) Field of Classification Search ................ 428/1.23, 428/1.32, 1.52, 354, 447, 451, 213, 214, 428/215, 334, 335; 156/325
See application file for complete search history.

(56) References Cited

U.S. PATENT DOCUMENTS

| | | | |
|---|---|---|---|
| 6,743,515 B1 | 6/2004 | Muller et al. | ................ 428/447 |
| 2003/0176124 A1* | 9/2003 | Koike et al. | ................... 442/16 |

FOREIGN PATENT DOCUMENTS

| | | |
|---|---|---|
| CN | 1304959 A | 7/2001 |
| JP | 63-191859 | 8/1988 |
| JP | 4-32805 | 2/1992 |
| JP | 06-145528 | 5/1994 |
| JP | 8-325457 | 12/1996 |
| JP | 10-319854 | 12/1998 |
| JP | 11-209708 | 8/1999 |
| JP | 2000-56694 | 2/2000 |
| JP | 2001-200162 | 7/2001 |
| JP | 2002-197940 | 7/2002 |
| JP | 3090774 | 10/2002 |
| JP | 2003-327833 | 11/2003 |

* cited by examiner

*Primary Examiner*—D. S Nakarani
(74) *Attorney, Agent, or Firm*—Oblon, Spivak, McClelland, Maier & Neustadt, L.L.P.

(57) ABSTRACT

Display-screen functional film product containing a laminate where an adhesive layer, a base film B and a silicone rubber layer are laminated in order on one surface of the functional film including a base film A and one or more functional layers laminated on a surface of the base film A. The product of the present invention does not undergo functional damage caused by heat or energy rays during production thereof, and thus is suitable for use in a display screen of a display device such as a CRT display, a liquid crystal display, or a plasma display.

17 Claims, No Drawings

FUNCTIONAL FILM FOR DISPLAY SCREEN AND METHOD FOR PRODUCING SAME

This application is a 371 of PCT/JP05/10682, filed Jun. 10, 2005.

TECHNICAL FIELD

The present invention relates to a functional film employed for display screens (hereinafter the film may be referred to as a "display-screen functional film product"). More particularly, the present invention relates to a display-screen functional film product which can impart a surface protective function and other functions to a display screen of a display device such as a CRT display, a liquid crystal display, or a plasma display.

BACKGROUND ART

With development of the information industry and electronics technology, display devices, such as CRT displays, liquid crystal displays, and plasma displays, have come to be widely employed not only in televisions and personal computers, but also in copy machines, facsimile machines, clocks, telephones, etc.

In order to impart, to the display screen of such a display device, a function, such as a scratch-resistant function for protecting the surface of the display screen from breakage or scratches caused by impact thereon, an anti-reflection function, an anti-static function, or an anti-glare function, a functional film formed of a base film having a layer with such a function is stuck to the display screen.

There has been proposed a layered structure including a functional film, and a rubber film which is formed of, for example, silicone rubber, and is directly on one surface of the functional film so that the functional film can be stuck to the display screen of a display device by means of the self-adhesive property of the rubber film (see, for example, Patent Document 1).

For fabrication of such a layered structure, a rubber film is laminated on one surface of a functional film through a procedure in which an unvulcanized rubber film is laminated on one surface of the functional film by method of coating or calendering, followed by heating or irradiation with energy rays, such as UV rays, electron beams, or γ-rays, for crosslinking of the rubber.

However, when such a functional film is exposed to heat or energy rays, such as UV rays, electron beams, or γ-rays, the functional film may undergo changes in properties, or the film may undergo curling or change in size (shrinkage). Such a change in the functional film, which is expensive, may raise serious problems in terms of productivity.

Patent Document 1: Japanese Patent Application Laid-Open (kokai) No. 2000-56694

DISCLOSURE OF THE INVENTION

In view of the aforementioned problems involved in prior arts, an object of the present invention is to provide a display-screen functional film product which can be produced without exposing an expensive functional film to heat or energy rays, such as UV rays, electron beams, or γ-rays, which may cause damage to the functional film. Another object of the present invention is to provide a method for producing the display-screen functional film product.

In order to achieve the aforementioned objects, the present inventors have conducted extensive studies, and as a result have found that the objects can be achieved by forming a layered structure wherein an adhesive layer, a base film, and a silicone rubber layer are laminated in order on one surface of a functional film. The present invention has been accomplished on the basis of this finding.

Accordingly, the present invention provides the following.

(1) display-screen functional film product comprising a laminate wherein an adhesive layer, a base film B and a silicone rubber layer are laminated in order on one surface of a functional film including a base film A and one or more functional layers laminated on a surface of the base film A.

(2) The display-screen functional film product as described in item (1) above, wherein the functional layer or layers is/are a layer having one or more functions selected from a scratch-resistant function, an anti-reflection function, an anti-static function, and an anti-glare function.

(3) The display-screen functional film product as described in item (1) or (2) above, wherein the functional film is formed by laminating one scratch-resistant layer and one or more other functional layers in order on one surface of the base film A, and the adhesive layer, the base film B, and the silicone rubber layer are laminated in order on the other surface of the base film A.

(4) The display-screen functional film product as described in item (1) or (2) above, wherein the functional film is formed by laminating one scratch-resistant layer and one anti-reflection layer in order on one surface of the base film A, and the adhesive layer, the base film B, and the silicone rubber layer are laminated in order on the other surface of the base film A.

(5) The display-screen functional film product as described in any of items (1) to (4) above, wherein the silicone rubber layer is formed of a silicone rubber containing an addition-type organopolysiloxane having a siloxane bond as a principal skelton and a vinyl group, and a platinum catalyst in an amount of 0.01 to 3 parts by mass on the basis of 100 parts by mass of the organopolysiloxane.

(6) The display-screen functional film product as described in item (5) above, wherein the silicone rubber constituting the silicone rubber layer further contains a silicone resin in an amount of 50 parts by mass or less on the basis of 100 parts by mass of the organopolysiloxane.

(7) A method for producing a display-screen functional film product as recited in item (1) above comprising sticking one surface of a functional film including a base film A and one or more functional layers laminated on a surface of the base film A to an adhesive layer of an adhesive film including an adhesive layer; and a base film B and a silicone rubber layer laminated in order on the adhesive layer.

According to the present invention, there is provided a display-screen functional film product which can be produced without exposing an expensive functional film to heat or energy rays, such as UV rays, electron beams, or γ-rays, which may cause damage to the functional film; as well as a method for producing the display-screen functional film product.

BEST MODE FOR CARRYING OUT THE INVENTION

No particular limitation is imposed on the base films A and B employed in the display-screen functional film product of the present invention, and they may be appropriately selected from films which have been conventionally known as bases for optical films.

Examples of such a conventionally known film include films of polyesters, such as polyethylene terephthalate, polybutylene terephthalate, and polyethylene naphthalate, polyethylene film, polypropylene film, cellophane, diacetyl cellulose film, triacetyl cellulose film, acetyl cellulose butyrate film, polyvinyl chloride film, polyvinylidene chloride film, polyvinyl alcohol film, ethylene-vinyl acetate copolymer film, polystyrene film, polycarbonate film, polymethylpentene film, polysulfone film, polyether ether ketone film, polyethersulfone film, polyetherimide film, polyimide film, fluorocarbon resin film, polyamide film, acrylic resin film, norbornene resin film, and cyclic olefin-containing film.

No particular limitation is imposed on the thickness of these base films, but the thickness of the base film A is preferably 20 to 400 µm, more preferably 50 to 250 µm, and the thickness of the base film B is preferably 2 to 250 µm, more preferably 25 to 125 µm.

If desired, one surface or both surfaces of each of these base films may be subjected to surface treatment through any technique, such as oxidation or formation of irregularities, or may be formed with a readily adhesive layer, for the purpose of improving adhesion between the base film and a layer to be laminated on a surface of the base film.

Examples of the aforementioned oxidation technique include corona discharge treatment, chromic acid treatment (wet process), flame treatment, hot air treatment, and ozone/UV ray irradiation treatment. Examples of the irregularity formation technique include sandblasting and solvent treatment. Such a surface treatment technique is appropriately selected in consideration of the type of the base film. From the viewpoints of, for example, efficiency and operability, corona discharge treatment is preferably employed.

In the display-screen functional film product of the present invention, the functional layer is specifically a layer having at least one function selected from a scratch-resistant function, an anti-reflection function, an anti-static function, an anti-glare function, and a similar function.

In the display-screen functional film product of the present invention, no particular limitation is imposed on the scratch-resistant layer, and the layer may be formed through an ordinary method. A coating liquid for forming the scratch-resistant layer may contain a thermosetting resin composition or an ionizing-radiation-curable resin composition. Preferred is an ionizing-radiation-curable resin, in particular, a radical-polymerizable, UV-curable resin, such as a polyester acrylate resin, an epoxy acrylate resin, a urethane acrylate resin, or a polyol acrylate resin. The scratch-resistant layer may be a layer containing metal oxide particles and a cured silane compound.

If necessary, the coating liquid for forming the scratch-resistant layer may contain a photopolymerization initiator or a variety of additives.

No particular limitation is imposed on the layer having an anti-reflection function, and the layer may be formed through an ordinary method. Examples of the anti-reflection layer include a transparent vacuum-deposited magnesium fluoride layer having a thickness equal to ¼ of the wavelength of visible light; a layered structure including a high-refractive-index substance layer and a low-refractive-index substance layer, such as a layered structure including alternately laminated titanium oxide layers and silicon oxide layers; and a layer coated with a low-refractive-index substance, such as a silicone resin or a fluorocarbon resin.

No particular limitation is imposed on the layer having an anti-static function, and the layer may be formed through an ordinary method. Examples of the anti-static layer include a layer coated with a material prepared by dispersing, in a binder, a conductive filler, such as a metallic conductive filler, a non-metallic conductive filler, or a carbon base conductive filler) or an organic anti-static agent.

No particular limitation is imposed on the layer having an anti-glare function, and the layer may be formed through a ordinary method. Examples of the material for forming the anti-glare layer include a material prepared by dispersing, in a binder, fine particles of an inorganic substance, such as silicon oxide, titanium oxide, aluminum oxide, tin oxide, zinc oxide, calcium carbonate, barium sulfate, talc, kaolin, or calcium sulfate, or organic fine particles, such as polymethyl methacrylate resin powder, acrylic styrene base resin powder, silicone base resin powder, polystyrene base resin powder, polycarbonate resin powder, benzoguanamine base resin powder, melamine base resin powder, polyolefin base resin powder, polyester base resin powder, polyamide base resin powder, polyimide base resin powder, or polyfluoroethylene base resin powder.

The above-described functional layer formation methods are for forming a layer having a single function. However, the functional layer employed in the present invention is a layer having at least one function selected from a scratch-resistant function, an anti-reflection function, an anti-static function, an anti-glare function, and a similar function, and a functional layer having two or more functions may be formed through combination of the above-described methods.

In the display-screen functional film product of the present invention, the functional film includes the base film A, and one or more functional layers laminated on a surface of the base film A. The functional film generally has a configuration in which one or more functional layers are laminated only on one surface of the base film A, but may have a configuration in which one or more functional layers are laminated also on the other surface of the base film A.

Preferably, the functional film has a configuration in which a scratch-resistant layer and another functional layer (in particular, an anti-reflection function) are laminated in order only on one surface of the base film A.

Thus, when one or more functional layers are laminated only on one surface of the base film A, an adhesive layer is formed directly on the other surface of the base film A, whereas when one or more functional layers are laminated also on the other surface of the base film A, an adhesive layer is formed on any of the functional layers.

In the display-screen functional film product of the present invention, no particular limitation is imposed on the adhesive constituting the adhesive layer. Preferably, the adhesive to be employed is an adhesive customary used for an optical film; for example, an acrylic base adhesive, a urethane base adhesive, or a polyvinyl ether base adhesive. From the viewpoint of good transparency, an acrylic base adhesive is more preferred.

The acrylic base adhesive can be produced from a combination of a variety of monomers. Preferably, the acrylic base adhesive is produced, by an ordinary method, through copolymerization of an alkyl (meth)acrylate monomer in which the alkyl group has four or more carbon atoms with a crosslinkable functional-group-containing monomer and, if necessary, with an additional copolymerizable monomer, and a crosslinking agent is further incorporated into the resultant copolymer.

Examples of the alkyl (meth)acrylate in which the alkyl group has four or more carbon atoms include butyl (meth)acrylate, pentyl (meth)acrylate, hexyl (meth)acrylate, 2-ethylhexyl (meth)acrylate, isooctyl (meth)acrylate, and decyl (meth)acrylate. The alkyl (meth)acrylate may be an alicyclic or aromatic alkyl (meth)acrylate, such as cycloalkyl (meth)

acrylate or benzyl (meth)acrylate. These alkyl (meth)acrylates may be employed singly or in combination of two or more kinds thereof.

The crosslinkable functional-group-containing monomer is a monomer containing, in the molecule, a polymerizable carbon-carbon double bond and a functional group, such as a hydroxyl group, a carboxyl group, an amino group, a substituted amino group, or an epoxy group. The crosslinkable functional-group-containing monomer to be employed is preferably a hydroxyl-group-containing unsaturated compound or a carboxyl-group-containing unsaturated compound.

Specific examples of such a crosslinkable functional-group-containing monomer include hydroxyalkyl (meth) acrylates such as 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, and 4-hydroxybutyl (meth)acrylate; acetoacetoxymethyl (meth)acrylate; monoalkylaminoalkyl (meth)acrylates such as monomethylaminoethyl (meth)acrylate, monoethylaminoethyl (meth)acrylate, monomethylaminopropyl (meth)acrylate, and monoethylaminopropyl (meth)acrylate; and ethylenic unsaturated carboxylic acids such as acrylic acid, methacrylic acid, crotonic acid, maleic acid, itaconic acid, and citraconic acid. These monomers may be employed singly or in combination of two or more kinds thereof.

Examples of the additional copolymerizable monomer which is optionally employed include alkyl (meth)acrylates in which the alkyl group has three or less carbon atoms, such as methyl (meth)acrylate, ethyl (meth)acrylate, and propyl (meth)acrylate; acrylamides such as acrylamide, methacrylamide, N-methylacrylamide, N,N-dimethylacrylamide, N-methylmethacrylamide, N,N-dimethylmethacrylamide, N-methylolacrylamide, N-methylolmethacrylamide, and diacetone acrylamide; and dialkylaminoalkyl (meth)acrylates such as dimethylaminoethyl (meth)acrylate, diethylaminoethyl (meth)acrylate, dimethylaminopropyl (meth)acrylate, and diethylaminopropyl (meth)acrylate. These monomers may be employed singly or in combination of two or more kinds thereof.

Examples of the crosslinking agent include an isocyanate base crosslinking agent, an epoxy base crosslinking agent, a metal chelate base crosslinking agent, an aziridine base crosslinking agent, and an amine resin.

These crosslinking agents may be employed singly or in combination of two or more kinds thereof.

The thickness of the adhesive layer is preferably 5 to 100 µm, more preferably 10 to 60 µm.

In the display-screen functional film product of the present invention, no particular limitation is imposed on the silicone rubber constituting the silicone rubber layer, and the silicone rubber to be employed may be any silicone rubber containing an organopolysiloxane as a component.

Examples of the organic group of the organopolysiloxane to be employed include hydrocarbon groups such as an alkyl group, an aryl group, and an alkenyl group.

Examples of the alkyl group include methyl, ethyl, and propyl; examples of the aryl group include phenyl; and examples of the alkenyl group include vinyl, allyl, butenyl, and hexenyl. An addition-type organopolysiloxane having a siloxane bond as a principal skelton and an alkenyl group (in particular, a vinyl group) is preferably employed, in view that such an organopolysiloxane exhibits appropriately slight sticking property and removability.

No particular limitation is imposed on the degree of polymerization of the organopolysiloxane to be employed, but the polymerization degree is generally 500 to 10,000, preferably 2,000 to 8,000.

In case of an addition-type organopolysiloxane is employed, a platinum catalyst is preferably employed in an amount of 0.01 to 3 parts by mass, more preferably 0.05 to 2 parts by mass, on the basis of 100 parts by mass of the addition-type organopolysiloxane.

Examples of the platinum catalyst include platinum black, platinic chloride, chloroplatinic acid, a reaction product between chloroplatinic acid and a monohydric alcohol, a chloroplatinic acid-olefin complex, and platinum bis(acetoacetate).

In order to enhance the adhesion of the organopolysiloxane to be employed, the organopolysiloxane may contain a silicone resin customary employed in a silicone base adhesive; i.e., a branched organopolysiloxane containing, in the molecule, hydroxyl groups bonded to silicon atoms.

The amount of the silicone resin is preferably 50 parts by mass or less, more preferably 5 to 20 parts by mass, on the basis of 100 parts by mass of the organopolysiloxane.

The thickness of the silicone rubber layer is preferably 5 to 100 µm, more preferably 10 to 60 µm.

The display-screen functional film product of the present invention can be produced through a variety of methods. Preferably, the display-screen functional film product is produced through the following procedure: there is formed a functional film including a base film A, and one or more functional layers laminated on a surface of the base film A; separately, there is formed an adhesive film including an adhesive layer, a base film B, and a silicone rubber layer laminated in order on the adhesive layer; and the functional film and the adhesive film are stuck to each other so that one surface of the former film is in contact with the adhesive layer of the latter film.

EXAMPLES

Next, the present invention will be described in more detail with reference to Examples, which shall never limit the present invention thereto.

In Examples and Comparative Examples, the following items were evaluated in accordance with the below-described procedures.

Curling

A display-screen functional film product (size: 10 cm×10 cm) was placed on a glass plate, and the vertical distance between the glass plate and each of the four corners of the film was measured. The average of the thus-measured four values was employed as "curling value."

Scratch-Resistant Function

The surface of a functional layer was rubbed 10 times with steel wool #0000 at a load of $9.8 \times 10^{-3}$ N/mm$^2$, and subsequently the presence or absence of scratches was confirmed through visual observation. Scratch-resistant function was evaluated on the basis of the following criteria.

O: No scratches are present.

x: Scratches are present.

Anti-Glare Function

Haze was measured by means of Haze Meter NDH2000 (product of Nippon Denshoku Kogyo).

Anti-Static Function

Surface resistance of a functional layer was measured by means of R-8252 DIGITAL ELECTROMETER (product of Advantest Corporation).

Anti-Reflection Function

Minimum reflectance was measured at a wavelength of 300 to 1,000 nm by means of Spectrophotometer UV-3101-PC (product of Shimadzu Corporation).

Example 1

0.2 parts by mass of a platinum catalyst (trade name: SRX-212, product of Dow Corning Toray Co., Ltd.) was added to 100 parts by mass of an addition-reaction-type silicone (trade name: KS-847H, product of Shin-Etsu Chemical Co., Ltd.), and the resultant mixture was diluted with methyl ethyl ketone to a solid content of about 20 mass %. The thus-obtained silicone solution was applied to one surface of a polyethylene terephthalate (PET) film (trade name: Lumirror T60, product of Toray Industries, Inc., thickness: 38 µm) serving as a base film B, followed by heating at 130° C. for two minutes for curing of the silicone, to thereby form a silicone rubber layer having a thickness of 30 µm. An untreated PET film (trade name: Lumirror T60, product of Toray Industries, Inc.) serving as a releasing film was attached on the silicone rubber layer, to thereby prepare a silicone-rubber-layer-comprising PET film.

Separately, a surface of a PET film was treated with a silicone release agent to serve as an another releasing film, and the thus-treated surface was coated with a toluene solution (solid content: 30 mass %) of an acrylic base adhesive prepared through addition of an isocyanate crosslinking agent (trade name: L-45, product of Soken Chemical & Engineering Co., Ltd.) to a copolymer of butyl acrylate (97 parts by mass) and acrylic acid (3 parts by mass), followed by heating at 90° C. for one minute. Thus, an adhesive layer having a thickness of 20 µm was formed, to thereby prepare an adhesive-layer-comprising PET film.

The thus-obtained silicone-rubber-layer-comprising PET film and adhesive-layer-comprising PET film were stuck to each other so that the silicone-rubber-layer-free surface of the silicone-rubber-layer-comprising PET film was in contact with the adhesive layer of the adhesive-layer-comprising PET film, to thereby prepare a silicone rubber adhesive film having a layered structure formed of releasing film/adhesive layer/base film B/silicone rubber layer/releasing film.

The thus-obtained silicone rubber adhesive film was subjected to cutting to have a size of 10 cm×10 cm, and the releasing film on the adhesive layer was peeled off for exposure of the adhesive layer. Separately, there was provided a functional film (trade name: Realook 5300-05, product of NOF Corporation, size: 10 cm×10 cm) formed by laminating the following functional layers; i.e., an anti-glare and scratch-resistant functional layer (thickness: 3 µm) and an anti-static and anti-reflection functional layer (thickness: 0.2 µm), in order on a PET film (thickness: 100 µm) serving as a base film A. The above-exposed adhesive layer was stuck to the functional-layer-free surface of the functional film (i.e., the base film A), to thereby prepare a display-screen functional film product of the present invention. A protective film (thickness: 60 µm) was attached on the functional layer side of the functional film.

The thus-obtained display-screen functional film product was evaluated in terms of curling value. Subsequently, the protective film attached on the display-screen functional film product was peeled off, followed by evaluation of scratch-resistant function, anti-glare function, anti-static function, and anti-reflection function. The results are shown in Table 1.

The display-screen functional film product exhibited scratch-resistant function, anti-glare function, anti-static function, and anti-reflection function virtually equivalent to those shown in Table 2 which had been evaluated before sticking of the functional film to the silicone rubber adhesive film.

Example 2

The procedure of Example 1 was repeated, except that the amount of platinum employed for preparing a silicone solution was changed from 0.2 parts by mass to 2 parts by mass, to thereby prepare a display-screen functional film product of the present invention. In this case, the solid content of the silicone solution was not changed; i.e., the solid content was regulated to about 20 mass %.

The thus-obtained display-screen functional film product was evaluated in terms of curling value. Subsequently, the protective film attached on the display-screen functional film product was peeled off, followed by evaluation of scratch-resistant function, anti-glare function, anti-static function, and anti-reflection function. The results are shown in Table 1.

The display-screen functional film product exhibited scratch-resistant function, anti-glare function, anti-static function, and anti-reflection function virtually equivalent to those as evaluated before sticking of the functional film to the silicone rubber adhesive film.

Example 3

The procedure of Example 1 was repeated, except that the amount of platinum employed for preparing a silicone solution was changed from 0.2 parts by mass to 1.5 parts by mass, and that 10 parts by mass of a silicone resin component (trade name: KR3700, product of Shin-Etsu Chemical Co., Ltd.) was added to the silicone solution, to thereby prepare a display-screen functional film product of the present invention. In this case, the solid content of the silicone solution was not changed; i.e., the solid content was regulated to about 20 mass %.

The thus-obtained display-screen functional film product was evaluated in terms of curling value. Subsequently, the protective film attached on the display-screen functional film product was peeled off, followed by evaluation of scratch-resistant function, anti-glare function, anti-static function, and anti-reflection function. The results are shown in Table 1.

The display-screen functional film product exhibited scratch-resistant function, anti-glare function, anti-static function, and anti-reflection function virtually equivalent to those as evaluated before sticking of the functional film to the silicone rubber adhesive film.

Example 4

The procedure of Example 1 was repeated, except that the amount of platinum employed for preparing a silicone solution was changed from 0.2 parts by mass to 0.1 parts by mass, to thereby prepare a display-screen functional film product of the present invention. In this case, the solid content of the silicone solution was not changed; i.e., the solid content was regulated to about 20 mass %.

The thus-obtained display-screen functional film product was evaluated in terms of curling value. Subsequently, the protective film attached on the display-screen functional film product was peeled off, followed by evaluation of scratch-resistant function, anti-glare function, anti-static function, and anti-reflection function. The results are shown in Table 1.

The display-screen functional film product exhibited scratch-resistant function, anti-glare function, anti-static function, and anti-reflection function virtually equivalent to those as evaluated before sticking of the functional film to the silicone rubber adhesive film.

Example 5

The procedure of Example 1 was repeated, except that the amount of platinum employed for preparing a silicone solution was changed from 0.2 parts by mass to 0.5 parts by mass, to thereby prepare a display-screen functional film product of the present invention. In this case, the solid content of the silicone solution was not changed; i.e., the solid content was regulated to about 20 mass %.

The thus-obtained display-screen functional film product was evaluated in terms of curling value. Subsequently, the protective film attached on the display-screen functional film product was peeled off, followed by evaluation of scratch-resistant function, anti-glare function, anti-static function, and anti-reflection function. The results are shown in Table 1.

The display-screen functional film product exhibited scratch-resistant function, anti-glare function, anti-static function, and anti-reflection function virtually equivalent to those as evaluated before sticking of the functional film to the silicone rubber adhesive film.

Example 6

The procedure of Example 1 was repeated, except that the amount of platinum employed for preparing a silicone solution was changed from 0.2 parts by mass to 0.15 parts by mass, and that 10 parts by mass of a silicone resin component (trade name: SD-4584, product of Dow Corning Toray Co., Ltd.) was added to the silicone solution, to thereby prepare a display-screen functional film product of the present invention. In this case, the solid content of the silicone solution was not changed; i.e., the solid content was regulated to about 20 mass %.

The thus-obtained display-screen functional film product was evaluated in terms of curling value. Subsequently, the protective film attached on the display-screen functional film product was peeled off, followed by evaluation of scratch-resistant function, anti-glare function, anti-static function, and anti-reflection function. The results are shown in Table 1.

The display-screen functional film product exhibited scratch-resistant function, anti-glare function, anti-static function, and anti-reflection function virtually equivalent to those as evaluated before sticking of the functional film to the silicone rubber adhesive film.

Example 7

The procedure of Example 1 was repeated, except that the functional film (Realook 5300-05) was replaced by a functional film (trade name: Realook 8200, product of NOF Corporation, size: 10 cm×10 cm) formed by laminating the following functional layers; i.e., a scratch-resistant functional layer (thickness: 3 µm) and an anti-static and anti-reflection functional layer (thickness: 0.2 µm), in order on a triacetyl cellulose film (thickness: 80 µm) serving as a base film A, to thereby prepare a display-screen functional film product of the present invention.

The thus-obtained display-screen functional film product was evaluated in terms of curling value. Subsequently, the protective film attached on the display-screen functional film product was peeled off, followed by evaluation of scratch-resistant function, anti-static function, and anti-reflection function. The results are shown in Table 1.

The display-screen functional film product exhibited scratch-resistant function, anti-static function, and anti-reflection function virtually equivalent to those as evaluated before sticking of the functional film to the silicone rubber adhesive film.

Example 8

To 100 parts by mass of a UV-curable resin (trade name: UA-306H, product of Kyoeisha Chemical Co., Ltd.) were added 5 parts by mass of an isocyanate compound (trade name: Coronate HL, product of Nippon Polyurethane Industry Co., Ltd.), 4 parts by mass of a photopolymerization initiator (trade name: IRUGACURE 184, product of Ciba Specialty Chemicals K.K.), and 0.03 parts by mass of a silicone additive (trade name: SH-28PA, product of Dow Corning Toray Silicone Co., Ltd.). Furthermore, 50 parts by mass of toluene serving as a dilution solvent was added to the resultant mixture, followed by stirring, to thereby prepare a coating liquid.

A PET film (trade name: A4100, product of Toyobo Co., Ltd., thickness: 100 µm) serving as a base film A was laminated with a readily adhesive layer, and the above-prepared coating liquid was applied to the readily-adhesive-layer-coated surface of the PET film so that the thickness of the coating after drying was 7 µm. After drying at 80° C. for one minute, the resin was cured through irradiation with UV rays (dose: 300 mJ/cm$^2$), to thereby form a scratch-resistant layer.

Anti-reflection layers; i.e., a titanium oxide ($TiO_2$) layer (thickness: 80 nm) and a silicon oxide ($SiO_2$) layer (thickness: 95 nm), were laminated in order on the surface of the scratch-resistant layer through ion beam deposition, to thereby prepare a functional film comprising the scratch-resistant layer and anti-reflection layers.

The procedure of Example 1 was repeated, except that the functional film (Realook 5300-05) was replaced by the above-obtained functional film, to thereby prepare a display-screen functional film product of the present invention.

The thus-obtained display-screen functional film product was evaluated in terms of curling value, scratch-resistant function and anti-reflection function. The results are shown in Table 1.

The display-screen functional film product exhibited scratch-resistant function and anti-reflection function virtually equivalent to those as evaluated before sticking of the functional film to the silicone rubber adhesive film.

Comparative Example 1

The silicone solution employed in Example 1 was applied to the functional-layer-free surface of the functional film (Realook 5300-05) employed in Example 1, followed by heating at 130° C. for two minutes for curing of the silicone, to thereby form a silicone rubber layer having a thickness of 30 µm.

A PET film (trade name: Lumirror T60, product of Toray Industries, Inc.) serving as a releasing film was attached on the silicone rubber layer, to thereby prepare a display-screen functional film product.

The thus-obtained display-screen functional film product was evaluated in terms of curling value. Subsequently, the protective film attached on the display-screen functional film product was peeled off, followed by evaluation of scratch-resistant function, anti-static function, and anti-reflection function. The results are shown in Table 1.

The display-screen functional film product exhibited a curling value higher, by a factor of two or more, than that in the case of Example 1; i.e., the functional film product exhibited poor workability in terms of sticking of the PET film. The display-screen functional film product exhibited scratch-resistant function, anti-glare function, and anti-static function virtually equivalent to those as evaluated before sticking of the PET film. However, the anti-reflection function was impaired.

Comparative Example 2

The silicone solution employed in Example 1 was applied to the functional-layer-free surface of the functional film (Realook 8200) employed in Example 7, followed by heating at 130° C. for two minutes for curing of the silicone, to thereby form a silicone rubber layer having a thickness of 30 µm.

A PET film (trade name: Lumirror T60, product of Toray Industries, Inc.) serving as a releasing film was attached on the silicone rubber layer, to thereby prepare a display-screen functional film product.

The thus-obtained display-screen functional film product was evaluated in terms of curling value. Subsequently, the protective film attached on the display-screen functional film product was peeled off, followed by evaluation of scratch-resistant function, anti-static function, and anti-reflection function. The results are shown in Table 1.

The display-screen functional film product exhibited a curling value higher, by a factor of about five, than that in the case of Example 7; i.e., the functional film product exhibited poor workability in terms of sticking of the PET film. The display-screen functional film product exhibited scratch-resistant function and anti-static function virtually equivalent to those as evaluated before sticking of the PET film. However, the anti-reflection function was impaired.

TABLE 1

| | | Functions | | | |
|---|---|---|---|---|---|
| | Curling value | Scratch-resistant | Anti-glare | Anti-static | Anti-reflection |
| Example 1 | 1.8 mm | ○ | 5.0% | $10^9$ | 1.2% |
| Example 2 | 1.7 mm | ○ | 5.0% | $10^9$ | 1.2% |
| Example 3 | 1.8 mm | ○ | 5.0% | $10^9$ | 1.2% |
| Example 4 | 1.8 mm | ○ | 5.0% | $10^9$ | 1.2% |
| Example 5 | 1.7 mm | ○ | 5.0% | $10^9$ | 1.2% |
| Example 6 | 1.8 mm | ○ | 5.0% | $10^9$ | 1.2% |
| Example 7 | 2.3 mm | ○ | — | $10^9$ | 0.3% |
| Example 8 | 1.0 mm | ○ | — | — | 0.3% |
| Comparative Example 1 | 4.3 mm | ○ | 5.1% | $10^9$ | 1.4% |
| Comparative Example 2 | 11.5 mm | ○ | — | $10^9$ | 0.5% |

TABLE 2

| | Scratch-resistant | Anti-glare | Anti-static | Anti-reflection |
|---|---|---|---|---|
| Examples 1 to 6 | ○ | 5.0% | $10^9$ | 1.2% |
| Example 7 | ○ | — | $10^9$ | 0.3% |
| Example 8 | ○ | — | — | 0.3% |

INDUSTRIAL APPLICABILITY

The display-screen functional film product of the present invention does not undergo functional damage caused by heat or energy rays during production thereof, and thus is suitable for use in a display screen of a display device such as a CRT display, a liquid crystal display, or a plasma display.

The invention claimed is:

1. A display-screen functional film product comprising a laminate wherein an adhesive layer, a base film B and a silicone rubber layer are laminated in order on one surface of a functional film including a base film A and one or more functional layers laminated on the other surface of the base film A,
wherein the silicone rubber layer comprises a silicone rubber comprising an addition-type organopolysiloxane having a siloxane bond as a principal skelton and a vinyl group, and a platinum catalyst in an amount of 0.01 to 3 parts by mass on the basis of 100 parts by mass of the organopolysiloxane, and
wherein the silicone rubber comprises 50 parts by mass or less, on the basis of 100 parts by mass of the organopolysiloxane, of a branched organopolysiloxane containing, in the molecule, hydroxyl groups bonded to silicon atoms.

2. The display-screen functional film product as described in claim 1, wherein the functional layer or layers is/are a layer having one or more functions selected from a scratch-resistant function, an anti-reflection function, an anti-static function, and an anti-glare function.

3. The display-screen functional film product as described in claim 1, wherein the functional film is formed by laminating one scratch-resistant layer and one or more other functional layers in order on one surface of the base film A, and the adhesive layer, the base film B, and the silicone rubber layer are laminated in order on the other surface of the base film A.

4. The display-screen functional film product as described in claim 1, wherein the functional film is formed by laminating one scratch-resistant layer and one anti-reflection layer in order on one surface of the base film A, and the adhesive layer, the base film B, and the silicone rubber layer are laminated in order on the other surface of the base film A.

5. The display-screen functional film product as described in claim 1, wherein the silicone rubber layer consists of said silicone rubber.

6. The display-screen functional film product as described in claim 5, wherein the silicone rubber comprises said branched organopolysiloxane in an amount of 5 to 20 parts by mass on the basis of 100 parts by mass of the organopolysiloxane.

7. The display-screen functional film product as described in claim 1, wherein the adhesive layer comprises an acrylic base adhesive and has a thickness of 5 to 100 µm.

8. The display-screen functional film product as described in claim 1, wherein the thickness of base film A is 20 to 400 µm and the thickness of base film B is 2 to 250 µm.

9. The display-screen functional film product as described in claim 1, wherein the degree of polymerization of the organopolysiloxane is 500 to 10,000.

10. The display-screen functional film product as described in claim 1, wherein the degree of polymerization of the organopolysiloxane is 2,000 to 8,000.

11. The display-screen functional film product as described in claim 1, wherein the platinum catalyst is employed in an amount of 0.05 to 2 parts by mass, on the basis of 100 parts by mass of the addition-type organopolysiloxane.

12. The display-screen functional film product as described in claim 1, wherein the thickness of the silicone rubber layer is 5 to 100 µM.

13. The display-screen functional film product as described in claim 1, wherein the thickness of the silicone rubber layer is 10 to 60 µm.

14. The display-screen functional film product as described in claim 1, wherein the silicone rubber comprises no branched organopolysiloxane.

15. The display-screen functional film product as described in claim 1, wherein:
- the functional layer or layers is/are a layer having one or more functions selected from a scratch-resistant function, an anti-reflection function, an anti-static function, or an anti-glare function,
- the silicone rubber comprises no branched organopolysiloxane,
- the adhesive layer comprises an acrylic base adhesive and has a thickness of 5 to 100 µm,
- the thickness of base film A is 20 to 400 µm and the thickness of base film B is 2 to 250 µm;
- the degree of polymerization of the organopolysiloxane is 2,000 to 8,000,
- the platinum catalyst is employed in an amount of 0.05 to 2 parts by mass, on the basis of 100 parts by mass of the addition-type organopolysiloxane, and
- the thickness of the silicone rubber layer is 10 to 60 µm.

16. A method for producing a display-screen functional film product as recited in claim 1, comprising sticking one surface of a functional film including base film A and one or more functional layers laminated on the other surface of the base film A to an adhesive layer of an adhesive film including an adhesive layer, and a base film B and a silicone rubber layer laminated on the adhesive layer.

17. The method as described in claim 16, wherein the functional layer or layers is/are a layer having one or more functions selected from a scratch-resistant function, an anti-reflection function, an anti-static function, or an anti-glare function.

* * * * *